US006968857B2

(12) United States Patent
Hawkins et al.

(10) Patent No.: US 6,968,857 B2
(45) Date of Patent: Nov. 29, 2005

(54) PRESSURE REDUCING FLUID REGULATORS

(75) Inventors: James Chester Hawkins, Allen, TX (US); David Edwards Woollums, Frisco, TX (US); Neal Arthur Ackerman, McKinney, TX (US); Chun Lin, McKinney, TX (US); Harold Joe McKinney, Durant, OK (US); Erik Matthew Quijano, San Antonio, TX (US)

(73) Assignee: Emerson Process Control, Austin, TX (US)

( * ) Notice: Subject to any disclaimer, the term of this patent is extended or adjusted under 35 U.S.C. 154(b) by 201 days.

(21) Appl. No.: 10/400,704

(22) Filed: Mar. 27, 2003

(65) Prior Publication Data

US 2004/0187930 A1    Sep. 30, 2004

(51) Int. Cl.[7] ............................................. G05D 16/02
(52) U.S. Cl. .................. 137/505.46; 251/284
(58) Field of Search .................. 137/315.04, 385.05, 137/505.46; 251/284, 285, 58, 60

(56) References Cited

U.S. PATENT DOCUMENTS

| | | | | |
|---|---|---|---|---|
| 35,146 | A | * | 5/1862 | Edson ........................ 137/171 |
| 997,038 | A | * | 7/1911 | Brummer .................... 137/495 |
| 2,660,834 | A | * | 12/1953 | Macglashan, Jr. ....... 137/505.39 |
| 3,443,583 | A | * | 5/1969 | Floyd et al. ........... 137/505.12 |
| 3,892,255 | A | * | 7/1975 | Johnson .................... 137/116.5 |
| 5,423,344 | A | * | 6/1995 | Miller ........................ 137/209 |
| 5,797,425 | A | * | 8/1998 | Carter et al. ........... 137/505.46 |

FOREIGN PATENT DOCUMENTS

| | | |
|---|---|---|
| CA | 2199521 | 6/1996 |
| EP | 0 805 384 | 11/1997 |
| GB | 602601 | 5/1948 |
| GB | 1096772 | 12/1967 |

OTHER PUBLICATIONS

National Meter, Inc. Catalog. http://www.nationalmeter.com. pp. 13 and 22, as printed on Aug. 18, 2003.
Schlumberger Limited. Product Bulletin. http://www.slb.com/Hub/Docs/rms/NAM/Gas/B-42_Performance_ J1G.pdf, Jan. 1996.
American Meter Company. 1800C and 1800-HC Service Regulators SB-8515.6. http://www.americanmeter.com/literature/regs/sb85156.pdf. p. 4, as printed on Aug. 18, 2003.
RegO Products. High Pressure First Stage Regulators LV4403SR and TR Series Product Literature. http://www.regoproducts.com/A14.pdf. As printed on Aug. 18, 2003.

(Continued)

Primary Examiner—Stephen M. Hepperle
(74) Attorney, Agent, or Firm—Hanley, Flight & Zimmerman LLC (57) ABSTRACT

A pressure reducing fluid regulator having a housing with a flange including a plurality of ear-shaped protrusions is disclosed. Each of the protrusions includes at least one aperture configured to receive fastener such that the circumferential spacing between first and second fasteners is less than the circumferential spacing between the second fastener and a third fastener. The regulator includes a valve having a valve seat, a valve disc, a valve stem coupled to the valve disc and a valve guide that holds the valve stem. A lever having a first end coupled to the valve stem and a second end coupled to a diaphragm applies a force to the valve stem in a direction that is non-parallel to the longitudinal axis of the valve stem to cause the valve stem to frictionally engage the valve guide. The valve stem includes a stop that limits travel of the valve stem and disc toward the valve seat.

23 Claims, 4 Drawing Sheets

OTHER PUBLICATIONS

Sherwood, LPG Products Catalog. http://www.sherwood-valve.com/pdf/Jpg.pdf. p. 49, as printed on Aug. 18, 2003.

Fisher Controls Inter. Inc. Service Regulator Drawing. Copyright 1984.

Fisher Controls Inter. Inc. Gas Service Regulator Drawing. Copyright 1999.

Fisher Controls Inter. Inc. Propane Gas Regulator Catalog. Copyright 2001.

* cited by examiner

PRESSURE REDUCING FLUID REGULATORS

FIELD OF THE DISCLOSURE

The present disclosure relates generally to regulators and, more specifically, to pressure reducing fluid regulators.

BACKGROUND

In controlling the transmission of fluids in industrial processes such as, for example, oil and gas pipeline distribution systems, chemical processes, etc., it is often necessary to transmit the process fluid at a relatively high pressure through portions of the distribution system or process demanding a high volume or flow rate of the process fluid. As the high pressure process fluid travels through the distribution system or process, the pressure of the process fluid may be reduced at one or more points to supply a lower volume of the process fluid at a lower pressure to a subsystem that uses or consumes the process fluid.

Pressure reducing fluid regulators are typically used to reduce and control the pressure of a process fluid. In general, a pressure reducing fluid regulator varies the restriction through a valve that is serially interposed in the fluid flow path. In this manner, the pressure reducing fluid regulator can control the fluid flow rate and/or pressure provided at a downstream outlet of the regulator. Pressure reducing fluid regulators are typically implemented using either a pilot operated control mechanism or a direct acting control mechanism.

Pilot operated fluid regulators typically include a pilot stage diaphragm having a relatively small surface area. The pilot stage diaphragm typically responds to regulator output pressure to drive a second or main control stage that employs a diaphragm having a relatively large surface area. The larger diaphragm of the main stage provides the large forces needed to actuate the regulator valve.

Direct acting fluid regulators eliminate the pilot stage so that the fluid output pressure typically acts on a single relatively large diaphragm that is directly coupled to the regulator valve. As a result, a direct acting fluid regulator may be provided in a relatively compact housing having a relatively small mounting envelope.

A wide variety of pressure reducing fluid regulators, each of which may have a different set of design features suitable for a different application, are commonly available. For example, pressure reducing regulators designed for use in controlling the pressure of natural gas at a consumer site (e.g., a residence or commercial building) or other custody transfer point, are typically required to be relatively accurate. High regulator accuracy is usually achieved by configuring the regulator to have a high proportional band gain (i.e., a high mechanical gain). Several factors may be varied to achieve a high proportional band gain. For example, the regulator diaphragm area and lever ratio (i.e., a unit amount of diaphragm travel divided by the amount of valve stem and disc travel produced by the unit amount of diaphragm travel) substantially control the proportional band gain of a regulator. Generally speaking, a larger diaphragm area generates larger forces at any given pressure drop across the regulator and, thus, allows a corresponding reduction in the lever ratio. A reduction in the lever ratio results in a higher proportional band gain for the regulator, which increases the accuracy with which the regulator can control its output pressure.

On the other hand, pressure reducing fluid regulators designed for use in controlling the distribution of liquefied petroleum (LP) gas are relatively compact, which enables these regulators to be more easily mounted in confined spaces (e.g., tank domes). Accuracy is not as important for LP gas applications as it is for natural gas applications. Thus, a relatively smaller diaphragm can be used to minimize the mounting envelope of LP gas regulators. In addition, because pressure reducing regulators used in LP gas applications are often required to control relatively large pressure drops, the lower proportional band gain of these regulators tends to reduce the instability problems that are common in these applications.

Thus, the different performance requirements associated with different pressure reducing regulator applications have historically been in tension. The required design tradeoffs resulted in different regulator designs for different applications. For example, the use of a pressure regulator designed for use in a natural gas system is typically not suitable for use within a LP gas system due to the relatively large mounting envelope of a natural gas regulator. Further, the relatively larger proportional band gain of a natural gas regulator aggravates instability problems typically associated with the large pressure drops often encountered in LP gas applications. Likewise, due to their relatively low proportional band gains, pressure reducing regulators designed for use with LP gas systems are typically not sufficiently accurate for use in natural gas systems.

SUMMARY

In accordance with one example, a fluid regulator includes a housing and a flange with a first radius defining an inner portion of the flange and a second radius greater than the first radius that defines a mounting envelope of the fluid regulator. The flange may include a plurality of protrusions that are circumferentially spaced so that first and second ones of the plurality of protrusions are separated by a first circumferential spacing and the second one and a third one of the plurality of protrusions are separated by a second circumferential spacing greater than the first circumferential spacing. In addition, each of the plurality of protrusions may include at least one aperture configured to receive a fastener such that more than four apertures are provided by the flange.

In accordance with another example, a fluid regulator may include a housing and a diaphragm disposed within the housing. The fluid regulator may also include a valve disposed within the housing. The valve may include a valve seat, a valve disc, a valve stem, and a valve guide configured to hold the valve stem so that a sealing surface of the valve disc is substantially coplanar to the valve seat. The fluid regulator may further include a lever having a first end coupled to the valve stem and a second end coupled to the diaphragm. The first end of the lever may be coupled to the valve stem to force the valve stem in a direction that is non-parallel to a longitudinal axis of the valve stem.

In accordance with yet another example, a fluid regulator includes a housing and a diaphragm disposed within the housing. The fluid regulator may also include a valve disposed within the housing. The valve may include a valve seat, a valve disc and a valve stem. The valve stem may include a stop configured to limit the travel of the valve disc toward the valve seat.

DETAILED DESCRIPTION

Figure 1:
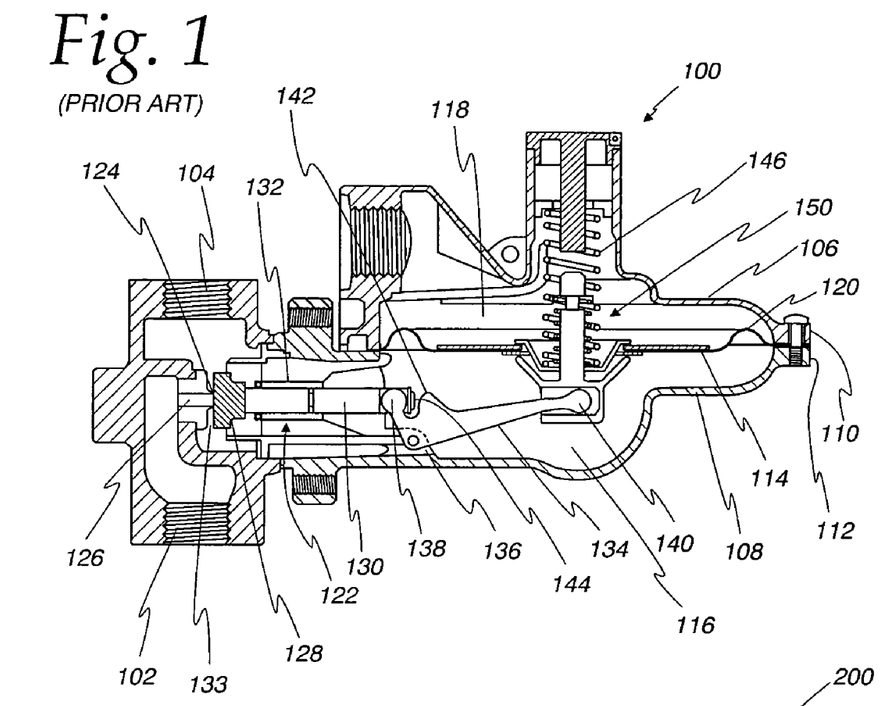
FIG. 1 is a cross-sectional view of a known direct acting pressure reducing fluid regulator.

FIG. 1 is a cross-sectional view of a known direct acting pressure reducing fluid regulator 100. The direct acting pressure reducing fluid regulator 100 shown in FIG. 1 may, for example, be used to control the flow and/or pressure of natural gas. As shown in FIG. 1, the fluid regulator 100 has a process fluid inlet 102 at which a relatively high pressure process fluid is presented and a fluid outlet 104 to which the fluid regulator 100 provides the process fluid at a lower regulated pressure. The fluid regulator 100 includes an upper housing portion 106 and a lower housing portion 108 that are joined at respective flange portions 110 and 112.

A diaphragm 114 is captured between the flange portions 110 and 112. The diaphragm 114 forms an output pressure control cavity or chamber 116 that is sealed with respect to the ambient (e.g., atmospheric pressure) surrounding the fluid regulator 100 and which is, under normal operating conditions, sealed with respect to an upper cavity or chamber 118. The diaphragm 114 may include a circumferential roll portion 120 as shown in FIG. 1 to enable a substantially linear motion of the diaphragm 114 in response to pressure changes across the diaphragm 114.

The fluid regulator 100 includes a valve assembly 122 having a valve seat 124 with a passage 126 therethrough that fluidly couples the fluid inlet 102 to the fluid outlet 104. The valve assembly 122 also includes a valve disc 128 that is coupled to a valve stem 130. A valve guide 132 holds the valve stem 130 so that a sealing surface 133 of the valve disc 128 maintains a substantially coplanar relationship to the valve seat 124 as the stem 130 and valve disc 128 slide along the longitudinal axis of the valve stem 130.

A lever 134 is fixed to the lower housing portion 108 via a pivot 136. A first end 138 of the lever 134 is coupled to the valve stem 130 and a second end 140 of the lever 134 is coupled to the diaphragm 114 as shown and described in greater detail below. The lever 134 also includes a stop 142 that contacts an end 144 of the valve stem 130. As described in greater detail below, the stop 142 limits counterclockwise rotation of the lever 134 about the pivot 136 and, thus, the travel of the valve stem 130 and disc 128 toward the valve seat 124.

In operation, a spring 146 biases the diaphragm 114 toward the lower housing portion 108, thereby forcing the second end 140 of the lever 134 downward and rotating the lever 134 clockwise about the pivot 136. The clockwise rotation of the lever 134 about the pivot 136 causes the first end 138 of the lever 134 to move away from the valve seat 124, thereby causing the valve stem 130 and disc 128 to withdraw from the valve seat 124. In addition, the stop 142 is not in contact with the end 144 of the valve stem 130. With the valve disc 128 separated or spaced from the valve seat 124, the passage 126 fluidly couples the fluid inlet 102 to the output pressure control chamber 116 and the fluid outlet 104. Thus, the valve assembly 122 is configured to be in a normally open condition.

As pressurized fluid enters the inlet 102, travels through the passage 126 and into the output pressure control chamber 116, the pressure in the output pressure control chamber 116 and at the outlet 104 increases. As the pressure in the output pressure control chamber 116 increases, the diaphragm 114 is forced upward against the spring 146 and the second end 140 of the lever 134 is pulled toward the upper housing portion 106. Such upward movement of the second end 140 of the lever 134 rotates the lever 134 counterclockwise about the pivot 136 and causes the first end 138 of the lever 134 to move along the longitudinal axis of the valve stem 130 toward the valve seat 124. In this manner, the first end 138 of the lever 134 forces the valve disc 128 toward the valve seat 124 to increase the fluid flow restriction of the valve assembly 122. The valve 122 is configured to provide a relatively large change in fluid flow rate for a relatively small change in the gap or separation between valve disc 128 and the valve seat 124. As a result, the pressure in the output chamber 116 will tend to reach an equilibrium point (for a given output control pressure) at which the diaphragm 114 is driven against the spring 146 to cause the second end 140 of the lever 134 to a corresponding fixed point or position within the output pressure chamber 116.

To prevent damage (e.g., indentation or other deformation) to the sealing surface 133 of the valve disc 128 as a result of excessive pressures (e.g., an overpressure condition) in the output pressure chamber 116, the stop 142 is configured to contact the end 144 of the valve stem 130 to limit counterclockwise rotation of the lever 134 about the pivot 136. This rotational limit serves to limit movement of the valve stem 130 and disc 128 along the longitudinal axis of the valve stem 130, thereby limiting the amount of force with which the valve disc 128 can be driven against the valve seat 124. The stop 142 also enables a relief valve 150 to function in the event that the output pressure in the chamber 116 exceeds a predetermined maximum limit.

As shown in FIG. 1, at the control point (i.e., the equilibrium point at which the valve disc 128 is in proximity to the valve seat 124), the forces exerted by the first end 138 of the lever 134 on the valve stem 130 are substantially parallel to (e.g., coaxial with) the longitudinal axis of the valve stem 130. In other words, the first end 138 of the lever 134 does not apply any significant force perpendicular to the longitudinal axis of the valve stem 130 (i.e., does not side load the valve stem 130 against the guide 132). As a result, the valve stem 130 and valve disc 128 are relatively free to move along the longitudinal axis of the valve stem 130 due to the very limited friction between the valve stem 130 and guide 132. Such freedom of longitudinal movement may be compounded by any freeplay or lash that may exist between the engagement of the first end 138 of the lever 134 and the stem 130. In operation, this freedom of movement along the longitudinal axis of the stem 130 can result in oscillation of the valve stem 130 and disc 128 (and, thus, the output pressure) at the control point, particularly in applications requiring a high pressure drop across the fluid regulator 100 (e.g., LP gas control applications). Such oscillations may result in poor output pressure control and premature wear and/or failure of regulator components such as, for example, the valve disc 128 and seat 124.

A further difficulty with the fluid regulator 100 shown in FIG. 1 is that the stop 142 is integral with the lever 134. Unfortunately, the tolerances associated with the location of the pivot 136 (which is attached to the lower housing portion 108), the dimensions of the lever 134 and the valve stem 130 can stack up. This tolerance stack up can cause a relatively wide variation in the amount of force with which the valve disc 128 is driven against the valve seat 124 when the stop 142 contacts the end 144 of the stem 130.

The tolerance stack up can also detrimentally affect the performance (e.g., the relief pressure) of the relief valve 150. In particular, as the point at which the upward motion of the diaphragm 114 is limited by the stop 142 varies, the pre-load force applied to the relief valve 150 by the spring 146 varies. For example, if the tolerance stack up is such that the upward motion of the diaphragm 114 is stopped closer to the upper housing 106, the pre-load force applied by the spring 146 on the diaphragm 114 and, thus, the relief valve 150 is increased. As a result, the pressure at which the relief valve 150 begins to open is increased. Of course, if the tolerance stack up is such that the upward motion of the diaphragm 114 is stopped further from the upper housing 106, the pressure at which the relief valve begins to open is decreased.

Figure 2:
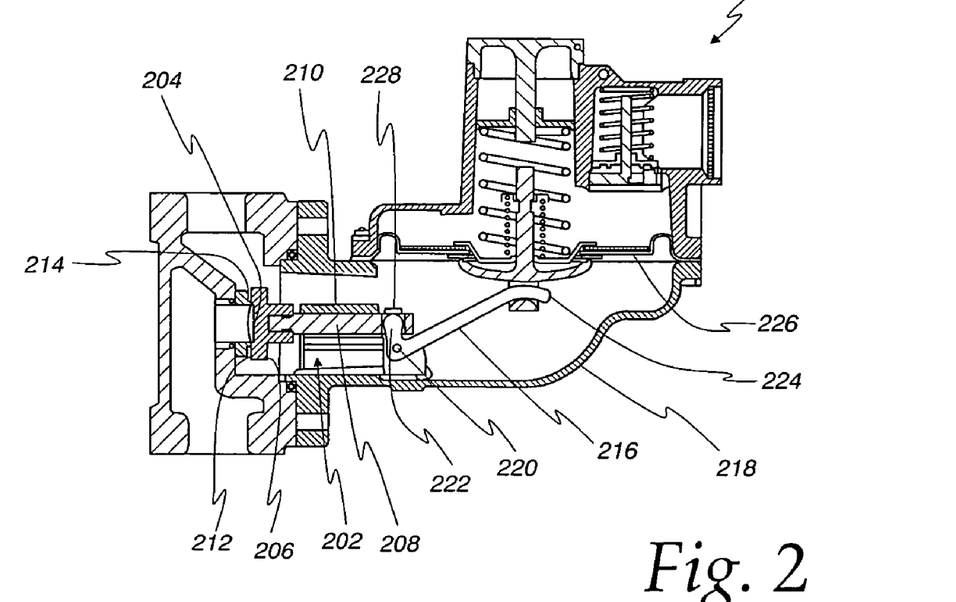
FIG. 2 is a cross-sectional view of an example of a direct acting pressure reducing fluid regulator that uses a stop integral with the fluid regulator valve stem.

FIG. 2 is a cross-sectional view of an example of a direct acting pressure reducing fluid regulator 200. In general, the fluid regulator 200 is similar in design and operation to the fluid regulator 100 shown in FIG. 1. However, several differences between the fluid regulator 200 and the known regulator 100 are described in detail below.

The regulator 200 includes a valve assembly 202 having a valve seat 204, a valve disc 206, a valve stem 208 that is coupled to the valve disc 206, and a valve guide 210 that holds the valve stem 208 so that a sealing surface 212 of the valve disc 206 is maintained in a substantially coplanar relationship with a sealing surface 214 of the valve seat 204. A lever 216 is fixed to a lower housing portion 218 of the regulator 200 via a pivot 220. The lever 216 has first end 222 that is coupled to the valve stem 208 and a second end 224 that is coupled to a diaphragm 226.

In contrast to the known regulator 100 shown in FIG. 1, the valve stem 208 includes a stop 228. The stop 228 may be integrally formed on the valve stem 208 or may be a separate component that is suitably fixed to the stem 208. In either case, the stop 228 limits the linear travel of the valve stem 208 (i.e., the movement of the stem 208 along its longitudinal axis within the valve guide 210) and, thus, the valve disc 206 toward the valve seat 204 to prevent damage (e.g., indentation, cutting, etc.) of the sealing surface 212 of the valve disc 206. Fixing the stop 228 to the valve stem 228 substantially reduces the effects of tolerance stack up so that the forces applied to the sealing surface 212 at the stopping point can be more precisely controlled. In addition, this improved control of the stopping point improves the pressure relief performance of the regulator 200.

Figure 3:
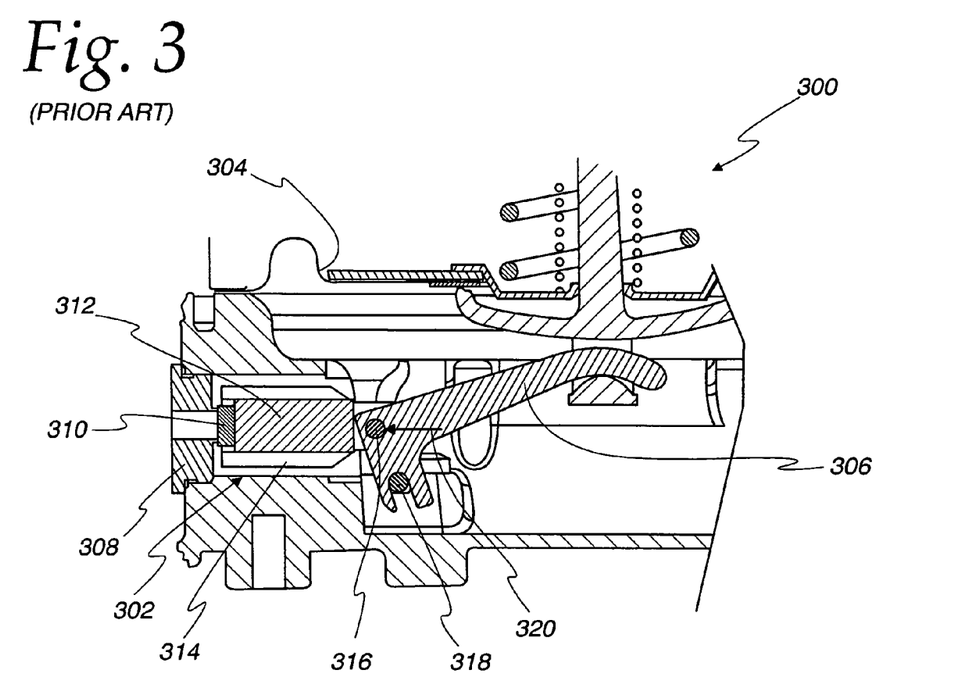
FIG. 3 is a partial cross-sectional view of another known direct acting pressure reducing fluid regulator.

FIG. 3 is partial cross-sectional view of another known fluid regulator 300. The fluid regulator 300 is typical of the pressure reducing regulators that are often used within LP gas systems. As shown in FIG. 3, the regulator 300 includes a valve assembly 302 that is operatively coupled to a diaphragm 304 via a lever 306. The valve assembly 302 includes a valve seat 308 and a valve disc 310. The valve disc 310 is fixed to a stem 312, which is supported by a valve guide 314. The lever 306 is coupled to the stem 312 via a pin or post 316 and rotates about a pivot 318 to drive the valve stem 312 and disc 310 along the longitudinal axis of the stem 312 and guide 314 toward or away from the seat 308.

With the known configuration of the lever 306 and the pin 316 shown in FIG. 3, the force applied by the lever 306 against the pin 316 and, thus, the stem 312, are substantially parallel (e.g., coaxial) to the longitudinal axis of the stem 312 as represented by the arrow at reference numeral 320. As a result, the stem 312 is not side loaded against the guide 314, which minimizes the friction between the stem 312 and guide 314. As a result of this minimal friction, lash or freeplay between, for example, the engagement of the pin 316 with the lever 306 may allow the stem 312 and disc 310 to oscillate (as well as the output control pressure) at the control point, particularly if the regulator 300 is controlling a large pressure drop.

Figure 4:
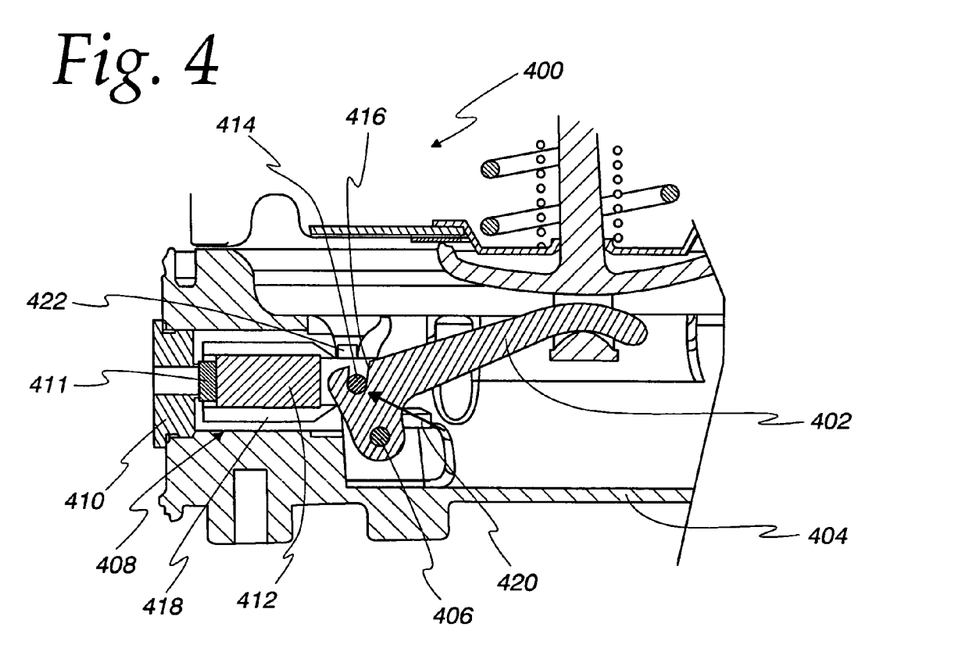
FIG. 4 is a partial cross-sectional view of an example of a fluid regulator that uses a lever configuration that side loads the fluid regulator valve stem.

FIG. 4 is a partial sectional view of an example of a lever configuration 400 that may be used within a pressure regulator, such as, for example, the regulators 200 and 300 shown in FIGS. 2 and 3, respectively. As shown in FIG. 4, a lever 402 is coupled to a regulator housing 404 via a pivot 406. A valve assembly 408 includes a valve seat 410, a valve disc 411 and a valve stem 412. The valve stem 412 includes a protrusion 414 that is disposed within a recess 416 in the lever 402. The protrusion 414 may be a cylindrically-shaped pin or any other suitable shape to maintain engagement with the lever 402 via the recess 416.

As depicted in FIG. 4, the recess 416 is shaped so that the resultant force exerted by the lever 402 against the protrusion 414 is not parallel or coaxial to the longitudinal axis of the stem 412. An example of one such resultant force vector is indicated at reference numeral 420. The shape of the recess 416 depicted in FIG. 4 is angled so that the wall of the recess 416 contacting the protrusion 414 is not perpendicular to the longitudinal axis of the stem 412. As a result, the point of contact between the wall of the recess 416 and the protrusion occurs at the tip of the arrow representing the resultant force vector shown at the reference numeral 420. In this manner, the lever 402 exerts a substantial force on the valve stem 412 that is perpendicular to the longitudinal axis of the valve stem 412 (i.e., the component of the resultant force 420 that is perpendicular to the longitudinal axis of the valve stem 412).

The force exerted perpendicularly to the longitudinal axis of the valve stem 412 side loads the stem 412 against the guide 418, thereby increasing the frictional force between the stem 412 and the guide 418. This increased frictional force serves to substantially minimize or eliminate oscillations of the valve stem 412 and disc 411 at the control point to provide a highly stable regulator output pressure under high pressure drop conditions.

Of course, the recess 416 shown in FIG. 4 is merely one example of a recess geometry that may be used to enable the lever 402 to apply a force to the stem 412 that is not coaxial or parallel to the longitudinal axis of the stem 412. In general, any mechanical engagement between the lever 402 and the protrusion 414 that applies a resultant force on the valve stem 412 having a substantial component that is perpendicular to the longitudinal axis of the stem 412 could be used to produce a sufficient frictional force between the valve guide 418 and the stem 412.

Additionally, a stop 422, similar or identical to the stop 228 shown in FIG. 2, may be included. As with the stop 228, the stop 422 limits the linear travel of the stem 412 and disc 411 to prevent damage and/or excessive wear to the seat 410 and disc 411.

Figure 5:
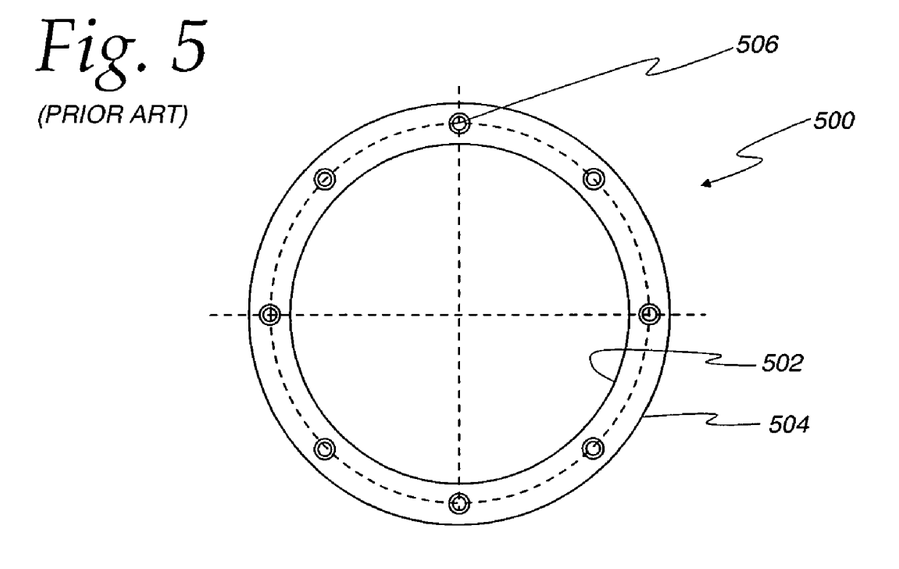
FIG. 5 is a plan view of a known fluid regulator flange configuration.

FIG. 5 is a plan view of a known regulator body flange configuration 500 that is typically used to implement the flanges of a pressure regulator such as, for example, the flange portions 110 and 112 of the regulator 100 shown in FIG. 1. As shown in FIG. 5, the flange 500 has an inner surface 502 having a first radius and an outer surface 504 having a second radius greater than the first radius. Thus, the flange 500 forms a ring of uniform width (i.e., the difference between the second radius and the first radius). The flange 500 also includes a plurality of apertures (one of which is indicated at 506) that are uniformly circumferentially spaced. In other words, the circumferential distance or radial angle between each of the apertures is substantially equal. The apertures are configured to receive fasteners such as, for example, bolts, self-tapping screws, or any other suitable fasteners.

Mating flanges employing the known flange configuration 500 depicted in FIG. 5 are typically sealed together via an inexpensive flat gasket. Unfortunately, the equal fastener spacing of the flange configuration 500 shown in FIG. 5 results in a relatively large regulator mounting envelope.

Figure 6:
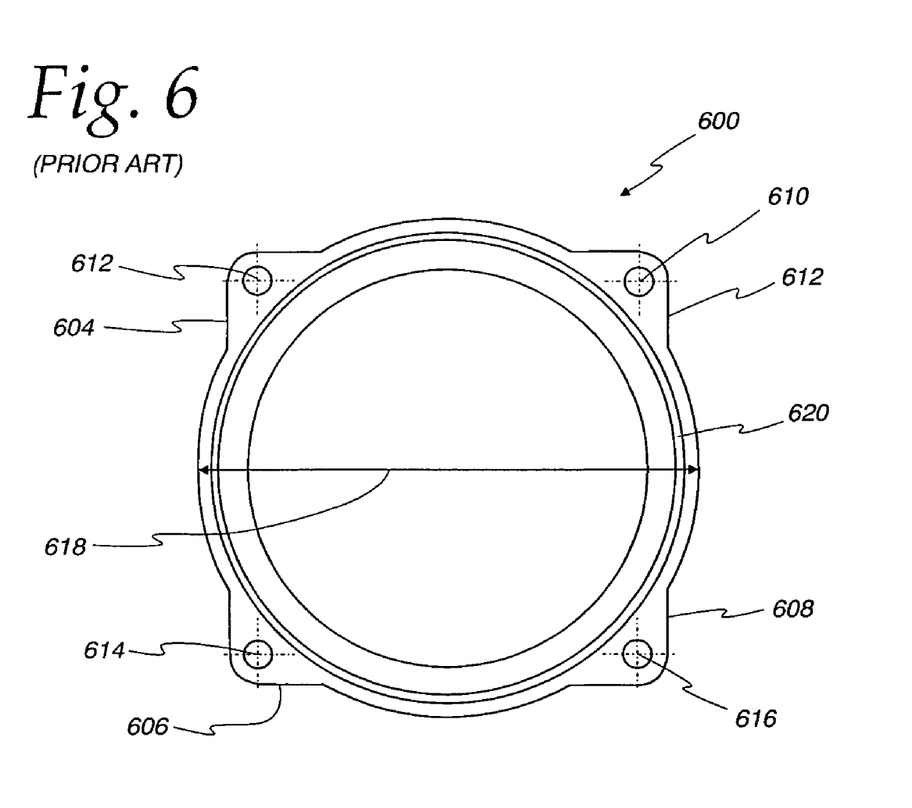
FIG. 6 is a plan view of another known fluid regulator flange configuration.

FIG. 6 is a plan view of another known regulator flange configuration 600 that is typically used to reduce the mounting envelope of a pressure regulator. As shown in FIG. 6, the flange configuration 600 includes four ears or protrusions 602, 604, 606 and 608. Each of the ears 602-608 has a respective aperture 610, 612, 614 and 616 that is configured to receive a fastener such as, for example, a self-tapping bolt or screw. The distance between the apertures 610 and 612 and the distance between the apertures 614 and 616 is equal to the distance between the apertures 610 and 616 and the distance between the apertures 612 and 614.

While the known flange configuration 600 of FIG. 6 can be used to reduce the mounting envelope of a regulator, the relatively few fasteners used by the configuration 600 and the relatively large spacing therebetween results in a large amount of flange deflection. To compensate for the relatively large flange deflections to prevent pressure leaks, the flange configuration 600 usually includes a diaphragm bead groove or channel 620 to enable use of a beaded diaphragm.

Figure 7:
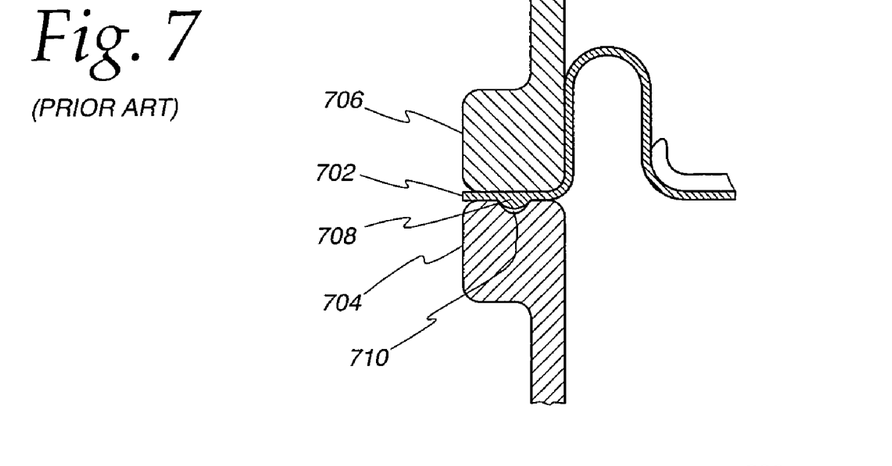
FIG. 7 is a more detailed cross-sectional view depicting the manner in which a beaded diaphragm is used with the fluid regulator flange configuration shown in FIG. 6.

FIG. 7 is a partial cross-sectional view that depicts the manner in which a beaded diaphragm 702 may be used to seal opposing flanges 704 and 706 that are based on the configuration 600 of FIG. 6. As shown in FIG. 7, the beaded diaphragm 702 has a bead portion 708 that is disposed within a bead groove or channel 710 of the flange 704. Displacement of the additional material associated with the bead 708 by the flanges 704 and 706 enables the flanges 704 and 706 to flex (e.g., separate) without compromising the seal provided by the diaphragm bead 708 against the bead channel 710.

Unfortunately, beaded diaphragms are relatively expensive to manufacture due to high defect rates and expensive process steps. Additionally, the tooling required to form a bead groove or channel (e.g., the bead channels 620 and 710 shown in FIGS. 6 and 7, respectively) within the flange results in relatively expensive tool maintenance. In particular, the tight radius areas of the tooling that form the bead groove or channel are susceptible to heat stress cracking.

Figure 8:
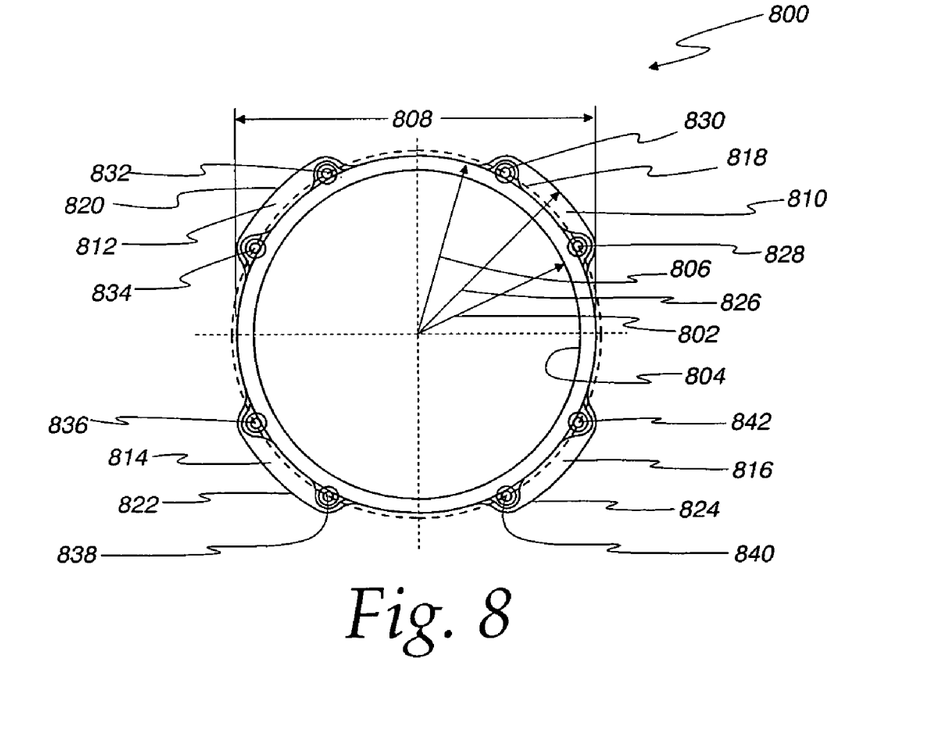
FIG. 8 is an example of a fluid regulator flange configuration that provides a reduced mounting envelope and which may be used with a flat gasket.

FIG. 8 is a plan view of an example flange configuration 800 that may be used with a fluid regulator such as, for example, the example fluid regulator 200 shown in FIG. 2. The flange configuration 800 has a first radius 802 defining an inner portion 804 of the flange 800 and a second radius 806 greater than the first radius 802 that defines a mounting envelope 808. The flange 800 includes a plurality of circumferentially spaced ear-shaped protrusions or ears 810, 812, 814 and 816. The ears 810–816 have respective outer portions 818, 820, 822 and 824 that define a third radius 826 that is greater than the second radius 806.

The ears 810–816 include respective pairs of apertures 828 and 830, 832 and 834, 836 and 838, and 840 and 842. The apertures 828–842 are configured to receive fasteners such as, for example, bolts, self-tapping screws, etc. As shown in the example of FIG. 8, the circumferential spacing between the apertures 828 and 830 is substantially the same as the circumferential spacing between the apertures 832 and 834, 836 and 838, and 840 and 842. In addition, the spacing between aperture pairs (e.g., 828 and 830) is less than the circumferential spacing between, for example, the apertures 830 and 832. In contrast to the known flange configuration 500 of FIG. 5, the example flange configuration 800 provides the same number of fasteners for strength but substantially reduces the mounting envelope. In addition, unlike the known flange configuration 600 of FIG. 6, the example flange configuration 800 of FIG. 8 provides a reduced mounting envelope without requiring the use of a beaded diaphragm. Instead, the example flange configuration 800 of FIG. 8 may be used with a relatively inexpensive flat gasket because the maximum spacing between fasteners is reduced (while maintaining a minimal mounting envelope) in comparison to known four bolt flange designs such as that shown in FIG. 6, thereby reducing flange flexing.

Several advantageous fluid regulator features have been disclosed herein. In particular, a stop integral with a regulator valve stem is disclosed. Such an integral stop reduces the effects of tolerance stack up to enable more precise control of the extent to which the valve disc may be driven against the valve seat. This improved control over the travel of the valve stem and disc with respect to the valve seat can be used to significantly reduce the wear and/or damage that may be imparted to the sealing surfaces of a regulator valve assembly, particularly as a result of overpressure conditions. In addition, improved control of the travel of the valve stem and disc may also provide more precise control of regulator relief valve operation.

A lever configuration that side loads the valve stem against the valve guide to increase the friction therebetween is also disclosed. Specifically, by controlling the resultant force vector with which the lever drives the valve stem to have a significant force component perpendicular to the longitudinal axis of the valve stem, the stem may be side loaded within the guide. Such side loading introduces a controlled friction between the stem and guide to significantly reduce or eliminate oscillation of the stem and disc at the control point, particularly where relatively large pressure drops are being controlled by the regulator.

Still further, a flange configuration that provides a reduced mounting envelope and which may be used with a relatively inexpensive flat gasket (as opposed to a beaded diaphragm) is disclosed. The disclosed flange configuration uses a plurality of fasteners for each flange ear or protrusion to eliminate the flange flexing problems commonly experienced with known reduced mounting envelope flange designs.

Any of the valve stem stop, lever configuration and flange configuration features disclosed herein could be used individually or in any desired combination to achieve a particular objective or to satisfy a particular application. For example, all three features could be combined within a single device to provide a regulator product suitable for use in both natural gas and LP gas applications. In particular, the reduced mounting envelope flange configuration and side loaded valve stem features would be particularly advantageous within LP gas applications due to the space constraints and high pressure drops (which tend to produce output pressure oscillations) that are commonly found in those applications. Further, a regulator having such features could also be made to have the control accuracy requirements needed to satisfy natural gas applications. Specifically, the disclosed flange configuration enables a relatively large diaphragm to be used, which enables a relatively low lever ratio to be used. As discussed above, a lower lever ratio improves proportional band gain and, thus, output pressure control accuracy.

Although certain apparatus have been described herein, the scope of coverage of this patent is not limited thereto. To the contrary, this patent covers all embodiments fairly falling within the scope of the appended claims either literally or under the doctrine of equivalents.

What is claimed is:

1. A fluid regulator, comprising:
   a housing;
   a flange with a first radius defining an inner portion of the flange and a second radius greater than the first radius that defines a mounting envelope of the fluid regulator;
   wherein the flange includes a plurality of protrusions that are circumferentially spaced so that first and second ones of the plurality of protrusions are separated by a first circumferential spacing and the second one and a third one of the plurality of protrusions are separated by a second circumferential spacing greater than the first circumferential spacing;
   wherein each of the plurality of protrusions includes at least one aperture configured to receive a fastener such that more than four apertures are provided by the flange;
   a valve having a seat, a valve disc and a stem coupled to the valve disc;
   a valve guide that holds the stem to maintain a sealing surface of the valve disc in a substantially coplanar relationship to the seat; and
   a lever having a first end coupled to the stem and a second end coupled to a diaphragm disposed within the fluid regulator, wherein the lever is coupled to the stem to apply a force component to the stem in a direction that is substantially perpendicular to the longitudinal axis of the stem.

2. A fluid regulator as defined in claim 1, wherein each of the protrusions includes at least two apertures.

3. A fluid regulator as defined in claim 2, wherein the at least two apertures associated with each of the protrusions are circumferentially spaced at the first circumferential spacing.

4. A fluid regulator as defined in claim 1, wherein the protrusions are ear-shaped.

5. A fluid regulator as defined in claim 1, further including a valve having a seat, a valve disc and a stem coupled to the valve disc, wherein the stem includes a stop configured to limit the travel of the valve disc toward the seat.

6. A fluid regulator as defined in claim 1, wherein the stem includes a protrusion and the first end of the lever includes a recess that is configured to receive the protrusion.

7. A fluid regulator, comprising:
   a housing;
   a diaphragm disposed within the housing;
   a valve disposed within the housing and having a valve seat, a valve disc and a valve stem;
   a valve guide configured to hold the valve stem so that a sealing surface of the valve disc is substantially coplanar to the valve seat;
   a lever having a first end coupled to the valve stem and a second end coupled to the diaphragm, wherein the first end is coupled to the valve stem to force the valve stem in a direction that is non-parallel to a longitudinal axis of the valve stem; and
   a stop coupled to the valve stem to limit the travel of the valve disc toward the valve seat.

8. A fluid regulator as defined in claim 7, wherein the lever is configured to apply a force to the valve stem that is substantially perpendicular to the longitudinal axis of the valve stem.

9. A fluid regulator as defined in claim 8, wherein the lever engages the valve stem via a recess.

10. A fluid regulator as defined in claim 9, wherein the recess has a wall that is angled to be non-perpendicular to the longitudinal axis of the valve stem.

11. A fluid regulator as defined in claim 8, wherein the valve stem includes a protrusion and wherein the first end of the lever includes a recess that receives the protrusion.

12. A fluid regulator as defined in claim 7, wherein the stop is integral with the valve stem.

13. A fluid regulator, comprising:
    a housing;
    a diaphragm disposed within the housing; and
    a valve disposed within the housing and having a valve seat, a valve disc and a valve stem, wherein the valve stem includes a stop configured to limit the travel of the valve disc toward the valve seat; and
    a lever having a first end coupled to the valve stem and a second end coupled to the diaphragm, wherein the first end of the lever is coupled to the valve stem to apply a force component to the valve stem in a direction that is substantially perpendicular to the longitudinal axis of the valve stem.

14. A fluid regulator as defined in claim 13, wherein the stop is integral with the valve stem.

15. A fluid regulator as defined in claim 13, wherein the first end of the lever is coupled to the valve stem to force the valve stem in a direction that is non-parallel to the longitudinal axis of the valve stem.

16. A fluid regulator as defined in claim 13, wherein first end of the lever engages the valve stem via a protrusion integral with the valve stem.

17. A fluid regulator, comprising:
    a flange with a first radius defining an inner portion of the flange and a second radius greater than the first radius that defines a mounting envelope of the fluid regulator, wherein the flange includes a plurality of protrusions that are circumferentially spaced so that first and second ones of the plurality of protrusions are separated by a first circumferential spacing and the second one and a third one of the plurality of protrusions are separated by a second circumferential spacing greater than the first circumferential spacing, and wherein each of the plurality of protrusions includes at least one aperture configured to receive a fastener such that more than four apertures are provided by the flange;
    a valve having a seat, a valve disc and a stem coupled to the valve disc;
    a valve guide that holds the stem to maintain a sealing surface of the valve disc in a substantially coplanar relationship to the seat;
    a lever having a first end coupled to the stem and a second end coupled to a diaphragm disposed within the fluid regulator, wherein the lever is coupled to the stem to apply a force to the stem in a direction that is non-parallel to a longitudinal axis of the stem; and a stop integral with the stem and configured to limit the travel of the valve disc toward the seat.

18. A fluid regulator, comprising:

a valve assembly including a valve stem and guide;

a lever engaged with the valve stem to side load the valve stem against the guide to control the friction there between; and a flange configured to receive at least five fasteners such that at least two circumferential spacings are associated with the at least five fasteners.

19. A fluid regulator as defined in claim 18, further including a stop integral with the valve stem, wherein the stop controls the extent to which a valve disc can drive against a valve seat.

20. A fluid regulator as defined in claim 18, further including a diaphragm sized so that the fluid regulator is configured to control the pressure of at least two different types of fluids.

21. A fluid regulator as defined in claim 20, wherein the at least two different types of fluids include natural gas and liquefied petroleum gas.

22. A fluid regulator, comprising:

a valve assembly including a valve stem and guide;

a lever engaged with the valve stem to side load the valve stem against the guide to control the friction therebetween; and a stop integral with the stem, wherein the stop controls the extent to which a valve disc can drive against a valve seat.

23. A fluid regulator as defined in claim 22, further including a diaphragm sized so that the fluid regulator is configured to control the pressure of at least two different types of fluids.

* * * * *

UNITED STATES PATENT AND TRADEMARK OFFICE
CERTIFICATE OF CORRECTION

PATENT NO. : 6,968,857 B2  Page 1 of 1
APPLICATION NO. : 10/400704
DATED : November 29, 2005
INVENTOR(S) : Hawkins et al.

It is certified that error appears in the above-identified patent and that said Letters Patent is hereby corrected as shown below:

Title Page Item (73) delete Assignee "Emerson Process Control, Austin, TX (US)"
Insert-- Fisher Controls International, LLC, St. Louis, MO (US).--

Signed and Sealed this

Tenth Day of April, 2007

JON W. DUDAS
*Director of the United States Patent and Trademark Office*